United States Patent [19]
Rowe, Jr.

[11] Patent Number: 5,726,850
[45] Date of Patent: Mar. 10, 1998

[54] FAIL SAFE PROTECTION CIRCUIT FOR PTC COMFORT DEVICES

[76] Inventor: William M. Rowe, Jr., P.O. Box 682, DeKalb, Miss. 39328

[21] Appl. No.: 685,408

[22] Filed: Jul. 24, 1996

[51] Int. Cl.[6] .................................................. H02H 3/00
[52] U.S. Cl. .......................... 361/100; 361/103; 361/118; 323/284; 219/497
[58] Field of Search ................................ 361/100, 103, 361/106, 118; 337/300; 323/235, 265, 284–285; 219/212, 494, 497, 507, 510, 528–529

[56] References Cited

U.S. PATENT DOCUMENTS

| | | | |
|---|---|---|---|
| 3,628,093 | 12/1971 | Crowley | 361/103 |
| 3,792,289 | 2/1974 | Kazem | 307/125 |
| 3,794,811 | 2/1974 | Hehl | 219/501 |
| 4,435,677 | 3/1984 | Thomas | 323/235 |
| 4,554,439 | 11/1985 | Cross et al. | 219/497 |
| 4,577,094 | 3/1986 | Mills | 219/505 |
| 4,882,782 | 11/1989 | Kimizuka et al. | 361/100 |
| 5,079,409 | 1/1992 | Takada et al. | 219/497 |

*Primary Examiner*—Jeffrey A. Gaffin
*Assistant Examiner*—Michael Sherry
*Attorney, Agent, or Firm*—George A. Bode; Lisa D. Charouel; Bode & Associates

[57] ABSTRACT

An electrical heating apparatus comprising a controller, fail safe protection circuit and resistance heating body embedded in a comfort device. The fail safe protection circuit is constructed to detect a break or short circuit in either of the conductors of a PTC type resistance heating body thereby shutting off the comfort device for preventing injury to the user and possible fires.

20 Claims, 2 Drawing Sheets

FAIL SAFE PROTECTION CIRCUIT FOR PTC COMFORT DEVICES

BACKGROUND OF THE INVENTION

1. Field of the Invention

The present invention relates to an electrical heating apparatus and, more particularly to an electrical heating apparatus, such as PTC type blankets, bed warmers, medical aids or the like, having a fail safe protection circuit for shutting off the electrical heating apparatus in case of overheating or other malfunctions.

2. General Background

Electrically heated personal comfort or medical aid devices use positive temperature coefficient material, hereinafter referred to as PTC. One of the main concerns in designing electrically heated personal comfort devices or the like, is to detect defective wiring conditions to reduce the risk of fire and injury to the user. Furthermore, the PTC conductors embedded in the personal comfort device may break or form a short circuit as the user repeated bunches, folds or flexes the personal comfort device thereby causing arcing in the PTC material which is known to cause fires.

Several devices have been patented which are aimed at safety circuits for electrical heating apparatuses.

U.S. Pat. No. 4,034,185 teaches the need for a safety circuit since the blanket may overheat causing possible fires and injury to the user.

U.S. Pat. Nos. 4,547,658, 3,628,093, and 4,281,237 teach using negative temperature coefficient material in parallel with the blanket heating element. The hygroscopic nature of the plastics used in negative temperature coefficient materials caused problems in designing adequate safety mechanisms in the apparatus.

Canadian Patent No. 1,156,300 teaches using fusing wire systems for protecting the heating apparatus. A tri-filar wound transformer for detecting unbalanced currents, much in the manner of a ground fault detector, and thermal elements were used in the safety circuit. The fusing wire system is not economically viable for protecting the electrical heating apparatus.

U.S. Pat. No. Re. 28,656 teaches using optically coupled components to operate light sensitive resistors for sensing negative temperature coefficient material conditions. The method turned the heating apparatus off when the current flowing through a light emitting neon bulb was interrupted.

Other patents present in the art are U.S. Pat. Nos. 4,577,094, 4,436,986 and Canadian Patent 1,115,317; all of which are directed to safety circuits in electrical heating apparatuses, but do not meet the needs of the apparatus of the present invention.

SUMMARY OF THE PRESENT INVENTION

The electrical heating apparatus of the present invention solves the aforementioned problems in a straightforward and simple manner. What is provided is an electrical heating apparatus comprising a plug in series with a controller means, fail safe protection circuit and resistance heating body embedded in a comfort device.

In view of the above, it is an object of the present invention to provide a fail safe protection circuit constructed to detect a break or short circuit in the conductors of the resistance heating body for preventing injury to the user and fires.

In particular, the fail safe protection circuit comprises a bidirectional triode thyristor, full wave rectifier, and triac driver means. The triac driver means controls the bidirectional triode thyristor between conductive and non-conductive states wherein upon detection of a break or short circuit in either of the conductors of the resistance heating body renders the bidirectional triode thyristor non-conductive thereby eliminating a source of electrical energy to the resistance heating body.

A further object of the present invention is to provide a varistor for protecting the components of the fail safe protection circuit from overvoltage surges which frequently occur in the source of electrical energy found in home.

It is an object of the present invention to detect shorted conductors or open conductors in a PTC device. Such a shorting or the breaking of a conductor in a PTC device will cause the plastic to burn with intense heat which cannot be extinguished.

In view of the above objects it is a feature of the present invention to provide a fail safe protection circuit which requires no modification to a conventional controller means or conventional resistance heating body and is simply placed in series therebetween.

It is not an object of the present invention to detect overheating, but to protect against two inherent failure modes of PTC devices.

The above objects and other features of the present invention will become apparent from the drawing, the description given herein, and the appended claims.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
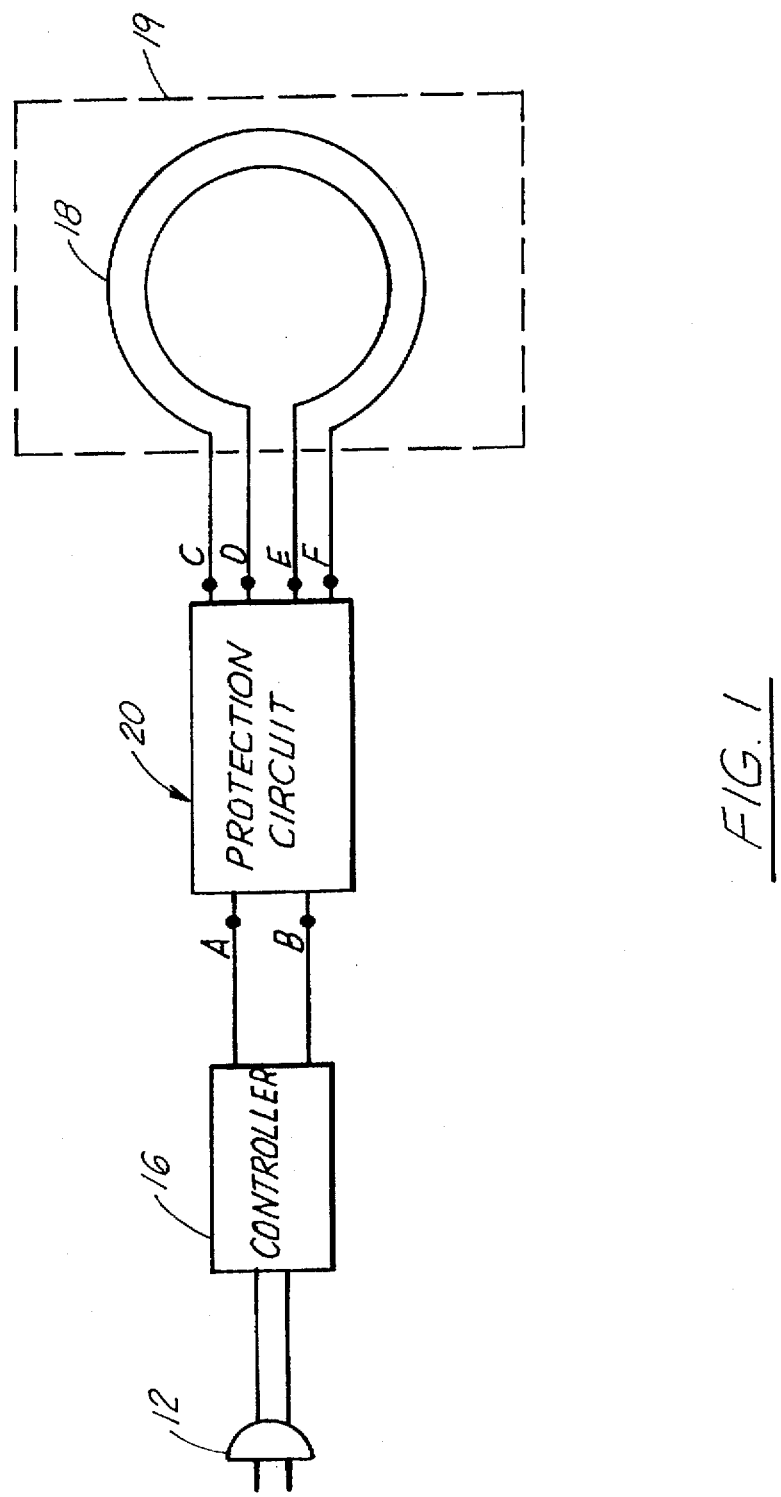
FIG. 1 is a schematic representation of the preferred embodiment of the electrical heating apparatus of the present invention; and, FIG. 2 is a schematic diagram of the fail safe protection circuit of FIG. 1 and, FIG. 3, is an enlarged schematic diagram of the triac driver means of FIG. 2.

Referring now to FIG. 1, the electrical heating apparatus of the present invention is designated generally by the numeral 10. Electrical heating apparatus 10 comprises plug 12 in series with controller means 16 and resistance heating body 18 embedded in comfort device 19. Conventional electrical heating apparatuses are disclosed in U.S. Pat. No. 4,910,391 entitled "Electrical Heating Element For Use in Personal Comfort Devices" herein incorporated by reference in its entirety.

Preferably, controller means 16 comprises a bimetallic thermostat switch or the like (not shown) for manually controlling the temperature level of the comfort device 19 by the user in a conventional manner. Controller means 16 receives 120 VAC, 60 Hertz from a source of electrical energy, such as a wall outlet, via plug 12 connected in series thereto. In the exemplary embodiment, resistance heating body 18 is a PTC type wire but not limited thereto. In a PTC type heater, the conductors are not made of PTC material; the PTC material is the plastic surrounding the conductors.

Electrical heating apparatus 10 further comprises fail safe protection circuit 20 is connected between controller means 16 and resistance heating body 18. The fail safe protection circuit 20 is designed to eliminate the source of electrical energy to turn off the resistance heating body 18 embedded in comfort device 19 in the event of a break or short circuit in either of the conductors of resistance heating body 18, as well as, any component malfunction of in fail safe protection circuit 20.

Figures 2, 3:
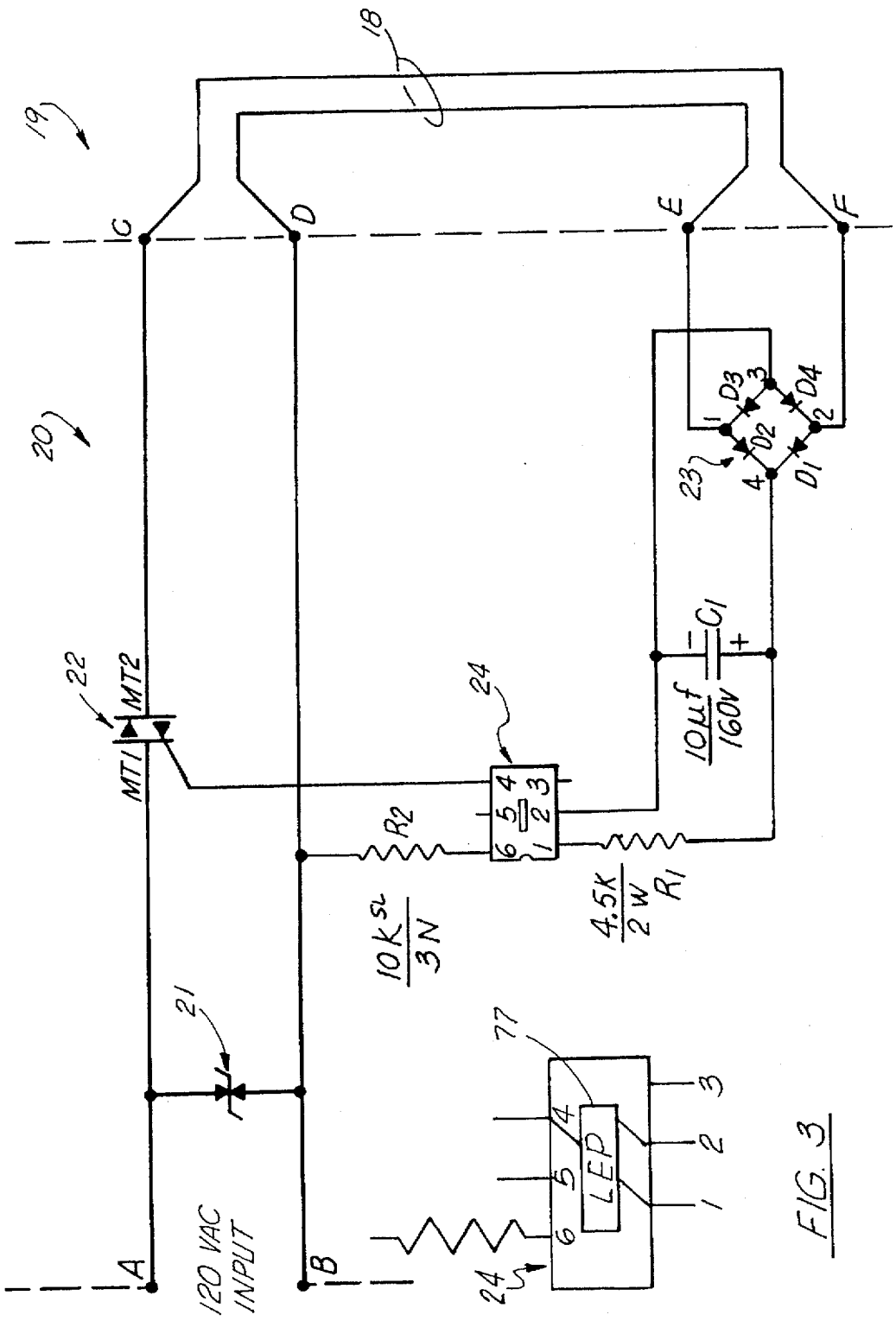

FIG. 2 illustrates a schematic diagram of fail safe protection circuit 20 of the present invention. Fail safe protection circuit 20 receives 120 VAC output signals from controller 16 at inputs A and B. Input A connects to a positive potential and input B connects to ground or a negative potential. Input A further couples to resistance heating body terminal C via bidirectional triode thyristor 22, hereinafter referred to as triac, coupled thereto thereby forming a first path. Input B further couples to resistance heating body terminal D, forming a second path. Varistor 21 has one terminal coupled to said first path between input A and an MT1 input of triac 22 and its other terminal coupled to said second path for protecting triac 22 from overvoltage surges from the source of electrical energy. MT2 of triac 22 connects to resistance heating body terminal C.

In the exemplary embodiment, bidirectional triode thyristor (triac) 22 is NTE 5629 rated at 400 VAC similarly any suitable triac rated at 400 VAC may be substituted. (It is desirable to rate the triac 22 at 600 VAC to provide greater reliability). Varistor 21 is a metal oxide varistor (MOV) such as NTE lv250 (manufactured by NTE Semiconductor) or any suitable MOV having a breakover voltage of no greater than 250 Volts RMS AC.

The distal end of resistance heating body 18 provides two output terminals E and F for connection to fail safe protection circuit 20. Terminals E and F couple to full wave rectifier 23 at rectifier inputs 1 and 2, respectively. Preferably, full wave rectifier 23 is a diode bridge rectifier having diodes D1, D2, D3 and D4 connected as shown. Full wave rectifier 23 is a NTE 5304; similarly, any suitable full wave rectifier having a PRV (Peak Reverse Voltage) of at least 60 VAC and a forward current rating of at least 0.05 amps may be substituted.

Rectifier output terminals 3 and 4 couple to pin 1 via resistor R1 and pin 2, respectively, of triac driver means 24. Storage capacitor C1 has one terminal connected between pin 2 of triac driver means 24 and rectifier output terminal 3 and its other terminal is connected between resistor R1 and rectifier output terminal 4. Pins 1 and 2 couple to a light emitting portion 77 of triac driver means 24 for illuminating or extinguishing said light emitting portion 77 based on the output of full wave rectifier 23. Pin 4 of triac driver means 24 couples to said first path at the gate of triac 22 wherein the state of the light emitting portion 77, i.e., illuminated or extinguished, controls the output of pin 4 for rendering triac 22 conductive or non-conductive, accordingly. Pin 6 of triac driver means 24 couples to said second path between varistor 21 and terminal D via current-limiting resistor R2. Pins 3 and 5 are blank pins as there is no ground other than pin 6 through R2 to AC. The function of pin 6 is to provide a continuous path through pin 4 to triac gate 22.

In the exemplary embodiment, resistor R1 and R2 are 4.5 KOhm/2 Watts and 10 KOhm/3 Watts resistors, respectively, and capacitor C1 is a 10 microfarad/160 Volt capacitor. Triac driver means 24 may be a SK 9708, NTE 3047 or any suitable optically coupled driver for controlling triac 22.

Conventionally, comfort device 19 is connected to a source of electrical energy via plug 12 for receiving 120 VAC. In operation, when controller 16 supplies 120 Volts AC to terminals A and B, triac 22 receives an input voltage pulse and is rendered conductive. Varistor 21 protects triac 22 from overvoltage surges. In the conductive state, triac 22 conducts to supply the source of electrical energy to resistance heating body 18 thereby causing resistance heating body 18, embedded in comfort device 19, to heat. As resistance heating body 18 increase in temperature the resistance of resistance heating body increases proportionately. Accordingly, the current flowing therethrough decreases proportionately. The current flowing therethrough is applied to terminals 1 and 2 of full wave rectifier 23 via terminals E and F coupled thereto, respectively. The rectified output at terminals 3 and 4 are stored across capacitor C1 and applied to pins 1 and 2 of triac driver means 24 thereby illuminating the light emitting portion of the triac driver means 24. Henceforth, output pin 4 of triac driver means 24 maintains triac 22 conductive for supplying the source of electrical energy to resistance heating body 18 thus maintaining comfort device 19 on. Comfort device 19 remains on until controller means 16 turns comfort device 19 off via manual operation of the controller means 16 by the user.

Nonetheless, overheating of resistance heating body 18 may result from either shorting of resistance heating body 18 or a conductor of body 18 breaking due to flexing. Said overheating is detrimental to the user of comfort device 19 causing injury to the user and possible fires.

In the event of said shorting or breaking of conductors of body 18, the current flow at terminals E and F is reduced to zero. The absence of current at terminals E and F through the full wave rectifier 23 via terminals 1 and 2, respectively, extinguishes the light emitting portion of triac driver means 24 thereby rendering triac 22 non-conductive. The non-conductive state of triac 22 prevents the source of electrical energy to be supplied to terminal C thereby shutting off resistance heating body 18 of comfort device 19, preventing possible fires and injury to the user.

Fail safe protection circuit 20 is designed, such that in the event of a break or short circuit in either of the conductors of resistance heating body 18, the AC voltage is substantially reduced to zero at terminals E and F. Accordingly, the voltage applied to pins 1 and 2 of the triac driver means 24 is substantially reduced to zero thereby extinguishing the light emitting portion of the triac driver means 24 which renders triac 22 non-conductive.

Moreover, fail safe protection circuit 20 is constructed, such that if triac driver means 24 malfunctions triac 22 is rendered non-conductive. Additionally, failure of full wave rectifier 23 extinguishes the light emitting portion of triac driver means 24 thereby rendering triac 22 non-conductive. Also, if triac 22 malfunctions the source of electrical energy is not supplied to terminal C.

Thus, fail safe protection circuit 20 of the present invention operates to detect a break or short circuit in either of the conductors of resistance heating body 19, as well as, component failure in fail safe protection circuit 20; henceforth, preventing injury to the user and possible fires that may arise as a result. Furthermore, fail safe protection circuit 20 of the present invention requires no modification to the conventional controller means 16 or conventional resistance heating body 18 and is simply placed in series therebetween.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An electrical heating apparatus for use in personal comfort devices, said electrical heating apparatus comprising:
   (a) controller means for supplying a source of electrical energy;
   (b) resistance heating body having conductors; and,
   (c) fail safe protection means coupled in series between said controller means and said resistance heating body for detecting a break or short circuit in any of said conductors of said resistance heating body, said fail safe protection means comprising:
      i. a triac coupled to said controller means and having conductive and non-conductive states for controlling the supply of said source of electrical energy to said resistance heating body;
      ii. rectifier means coupled to an output of said resistance heating body for receiving a current flowing therethrough; and,
      iii. driver means coupled to outputs of said rectifier means and a gate of said triac for maintaining said triac in said conductive state when the resistance heating body is functioning properly and renders said triac in said non-conductive state when said break or said short circuit of said conductors of said resistance heating body is detected.

2. The apparatus of claim 1, further comprising a varistor having one terminal connected to said triac wherein the varistor functions to protect said triac from overvoltage surges.

3. The apparatus of claim 2, wherein said varistor is a metal oxide varistor having a limiting voltage no greater than 250 Volts RMS AC.

4. The apparatus of claim 1, wherein said rectifier means has a PRV of at least 60 Volts AC and a forward current rating of at least 0.05 amps.

5. The apparatus of claim 1, wherein said rectifier means is a full wave diode bridge rectifier.

6. The apparatus of claim 1, wherein said driver means comprises a light emitting portion which receives said outputs of said rectifier means, wherein when said light emitting portion illuminates, said triac is maintained conductive and when extinguished said triac is rendered non-conductive.

7. The apparatus of claim 1, wherein failure of said driver means and rectifier means renders said triac non-conductive for preventing said source of electrical energy from being supplied to said resistance heating body.

8. An electrical heating apparatus for use in positive temperature coefficient type personal comfort devices, said electrical heating apparatus comprising:
   (a) a source of electrical energy;
   (b) resistance heating body having heaters made of positive temperature coefficient material wherein each heater of said heaters comprises a conductor; and,
   (c) fail safe protection means coupled in series between said source of electrical energy and said resistance heating body for detecting a break or short circuit in any of the conductors of said resistance heating body, said fail safe protection means comprising:
      i. a triac coupled to said controller means and having conductive and non-conductive states for controlling the supply of said source of electrical energy to said resistance heating body;
      ii. rectifier means coupled to outputs of said resistance heating body for rectifying a current flowing therethrough; and,
      iii. driver means coupled to outputs of said rectifier means and a gate of said triac for maintaining said triac in said conductive state when the resistance heating body is functioning properly and renders said triac in said non-conductive state when said break or said short circuit of said conductors of said resistance heating body is detected.

9. The apparatus of claim 8, further comprising a varistor having one terminal connected to said triac wherein the varistor functions to protect said triac from overvoltage surges.

10. The apparatus of claim 9, wherein said varistor is a metal oxide varistor having a limiting voltage no greater than 250 Volts RMS AC.

11. The apparatus of claim 8, wherein said rectifier means has a PRV of at least 60 Volts AC and a forward current rating of at least 0.05 amps.

12. The apparatus of claim 8, wherein said rectifier means is a full wave diode bridge rectifier.

13. The apparatus of claim 8, wherein said driver means comprises a light emitting portion which receives said outputs of said rectifier means, wherein when said light emitting portion illuminates, said triac is maintained conductive and when extinguished said triac is rendered non-conductive.

14. The apparatus of claim 8, wherein failure of said driver means and rectifier means renders said triac non-conductive for preventing said source of electrical energy from being supplied to said resistance heating body.

15. An electrical heating apparatus for use in personal comfort devices, said electrical heating apparatus comprising:
   (a) means for supplying a source of electrical energy;
   (b) heating element having conductors; and,
   (c) fail safe protection means coupled in series between said means for supplying a source of electrical energy and said heating element for detecting a break or short circuit in any of said conductors of said heating element, said fail safe protection means comprising:
      i. a triac coupled to said means for supplying said source of electrical energy and having conductive and non-conductive states for controlling the supply of said source of electrical energy to said heating element;
      iii. rectifier means coupled to outputs of said heating element for rectifying the outputs of said heating element; and,
      iv. driver means coupled to outputs of said rectifier means and optically coupled to a gate of said triac for maintaining said triac in said conductive state when the heating element is functioning properly and renders said triac in said non-conductive state when said break or said short circuit in any of said conductors of said heating element is detected, wherein said driver means comprises a light emitting portion wherein when said light emitting portion illuminates, said triac is maintained conductive and when extinguished said triac is rendered non-conductive.

16. The apparatus of claim 15, further comprising a varistor having one terminal connected to said triac wherein the varistor functions to protect said triac from overvoltage surges.

17. The apparatus of claim 15, wherein said varistor is a metal oxide varistor having a limiting voltage no greater than 250 Volts RMS AC.

18. The apparatus of claim 15, wherein said rectifier means has a PRV of at least 60 Volts AC and a forward current rating of at least 0.05 amps.

19. The apparatus of claim 15, wherein said rectifier means is a full wave diode bridge rectifier.

20. The apparatus of claim 15, wherein failure of said driver means and rectifier means renders said triac non-conductive for preventing said source of electrical energy from being supplied to said heating element.

* * * * *